Aug. 18, 1959

L. J. KOCI 2,899,888

COMBINED WAFFLE BAKER AND GRILL

Filed June 15, 1955

Inventor
LUDVIK J. KOCI
by
Mason, Kolehmainen, Rathburn & Wyss
Attorneys

Aug. 18, 1959     L. J. KOCI     2,899,888
COMBINED WAFFLE BAKER AND GRILL
Filed June 15, 1955     5 Sheets-Sheet 3

Fig. 6

Inventor,
LUDVIK J. KOCI
by
Mason, Kolehmainen, Rathburn & Wyss
Attorneys

Inventor
LUDVIK J. KOCI
Attorneys

United States Patent Office 2,899,888
Patented Aug. 18, 1959

2,899,888

COMBINED WAFFLE BAKER AND GRILL

Ludvik J. Koci, Hinsdale, Ill., assignor to Sunbeam Corporation, Chicago, Ill., a corporation of Illinois Application June 15, 1955, Serial No. 515,660

6 Claims. (Cl. 99—331)

The present invention relates to a combined waffle baker and grill, and more particularly to an improved arrangement in which an improved cooking device is provided which may readily be converted from a grill to a waffle baker or vice versa.

Waffle irons or waffle bakers, as they are commonly termed, have been developed to a high state of perfection with fully automatic control of the heating of the grids thereof so that any selected desired temperature may be maintained at the grids of the waffle baker. One such satisfactory waffle baker or waffle iron is disclosed and claimed in Jepson Patent No. 2,342,077, granted February 15, 1944, and assigned to the same assignee as the present application. Prior to the invention disclosed in the above-mentioned Jepson patent, waffle irons were generally of a configuration to make circular waffles. Since that time the trade has generally gone toward the making of rectangular or square waffles.

Housewives have also had available to them for some time an electric appliance commonly referred to as a sandwich toaster or sandwich grill. Such a sandwich toaster or sandwich grill is commonly comprised of a pair of opposed cooking surfaces between which is normally disposed a sandwich for toasting. Obviously, such a sandwich grill has other uses, but the one referred to above is the most common. Such grills have generally had a rectangular configuration. Thus, the configuration of such grills, except for the absence of waffle grids, is quite similar in many respects to waffles bakers on the market. Since the advent of the waffle iron for making rectangular waffles, there has been agitation for a combined waffle iron and grill whereby the same unit may be used for both purposes. There have been on the market for some time combination waffle irons and grills, as well as combination waffle irons and sandwich toasters. A particularly satisfactory combined waffle iron and sandwich toaster is disclosed and claimed in a copending Jepson application, Serial No. 317,936, filed October 31, 1952, and also assigned to the same assignee as the present application.

In general, the combination waffle baker and grill units heretofore available on the market have been unsatisfactory, since when designed to make good waffles they have operated unsatisfactorily as a grill. The present invention is primarily concerned with a combined waffle baker and grill in which the waffle grids are removable and may be substituted by grill plates thereby to provide the grill function of the apparatus. In prior art waffle bakers in which the waffle grids were removable, the problem of efficient thermostatic control of the waffle grids has been extremely difficult for the reason that the temperature responsive element for controlling the temperature of the grids could not be secured to one of the grids in good heat transfer relationship, since this would militate against removing the grids and replacing them with grill plates. In some arrangements a heat responsive element, such as a bimetallic element or a thermostat, was provided so that the grid or grill plate rested against it in use. Unfortunately, with such arrangements, the heat transfer between the grid or grill plate was found to be poor and erratic. In the first place, any deformation of the grid or grill plate which tended to move it out of contact with the heat responsive element, such as the bimetallic device, destroyed the accuracy of the control effected by the thermostat.

To insure good contact, some prior art combined waffle bakers and grills, having interchangeable grids and grill plates, have used a spring loaded heat conducting block arranged to be biased into good heat conducting relationship with the bottom surface of the grill plate or waffle grid, as the case might be. A thermostat or similar temperature responsive device is then operated in response to the temperature of the heat conducting block. This mounting arrangement is better than the one just described where the waffle grid or grill plate merely rested on the bimetallic element, since the spring loading avoids any separation between the thermostat and the grid or grill plate which might otherwise be caused by deformations of the upper grid or grill plate. However, the spring biased type of mounting is objectionable for several other reasons. First of all, the spring biasing means is structurally complicated and reduces the heat transfer between the adjacent parts, thus causing a lag and variation in response. Additionally, the spring biased conducting block may become separated from the superimposed grid or grill plate by crumbs or other foreign matter, with a resultant reduction in heat transfer and, hence, unsatisfactory operation of the temperature control mechanism. It would be desirable, therefore, to provide an improved arrangement of temperature control for a combined waffle baker and grill having interchangeable grids and grill plates in which satisfactory operation does not depend upon good heat transfer relationship between the grids or grill plates and a temperature responsive device.

In a waffle baker, it is essential that a relatively high temperature be provided under load conditions to make the cooking cycle of the waffle baker as short as possible. On the other hand, it is essential that the waffle grid temperature be limited to a temperature value of less than 500° F. to avoid damage to the coating normally provided on such waffle grids. It is common practice today to coat waffle grids with a silicone base or pan glaze thereby to eliminate the sticking of waffles to the grids. If this glaze or coating is subjected to temperatures above 500° F., it is subject to charring and decomposition. This puts a limit on the maximum no load temperature of the grids, and thus makes a good load characteristic a necessity to insure the maintenance of a reasonably high temperature under load conditions.

Thus, for some time manufacturers of waffle bakers have attempted to achieve what is generally referred to as a good load characteristic. The load characteristic of a waffle baker is determined by the difference in temperature of the waffle grids between the no load and load condition. Prior art waffle bakers have exhibited very poor load characteristics in that the temperatures of the waffle grids have dropped in temperature between one hundred and three hundred degrees Fahrenheit between the idling or no load condition and a three-quarter load condition. It would be desirable to provide an improved control means for a waffle baker which only permits a drop in temperature of the waffle grids between no load and three-quarter load of the order of fifty degrees Fahrenheit or less.

Accordingly, it is an object of the present invention to provide an improved combined waffle baker and grill.

It is another object of the present invention to provide an improved combined waffle baker and grill employing interchangeable waffle grids and grill plates.

It is another object of the present invention to provide an improved waffle baker in which no reliance upon thermal conduction between the temperature responsive device and the waffle grids is depended upon for satisfactory operation.

It is another object of the present invention to provide an improved combined waffle baker and grill with interchangeable waffle grids and grill plates in which temperature control is obtained by employing a radiation type thermostat.

It is a further object of the present invention to provide a new and improved waffle baker and grill combination together with improved control means for insuring proper temperature control whether the device is operated as a waffle baker or as a grill.

Still another object of the present invention resides in an improved waffle baker with temperature control means completely independent of the quantity, consistency and the like of the batter, but dependent only upon the temperature of the waffle grids.

It is a still further object of the present invention to provide an improved control means for a waffle baker or electric grill which provides a good load characteristic between no load and full load operation.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which.

The present invention is primarily concerned with a waffle baker having readily interchangeable waffle grids or grill plates which are latched into position in a simple manner. In addition, an improved radiation control temperature responsive device is employed which insures accurate control of the temperature of the waffle grids or grill plates at all times without in any way depending upon thermal conduction between the temperature responsive device and the grill plates or grids. Additionally, the control means insures that the temperature of the grill plates or grids will never exceed a predetermined value and at the same time insures a good load characteristic with very little drop in temperature between the no load and full load condition.

Figures 1, 2:
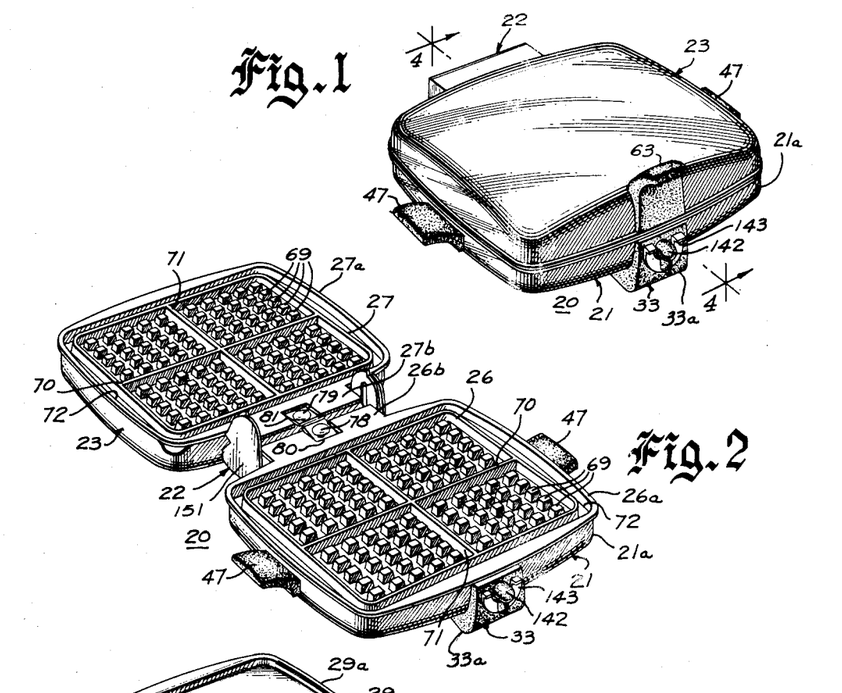
Fig. 1 is a perspective view of a combined waffle baker and grill embodying the present invention with the opposed cooking surfaces thereof in superimposed relationship.
Fig. 2 is a perspective view of the waffle baker of Fig. 1 with the device in open position and with the removable waffle grids in position.
Figure 3:
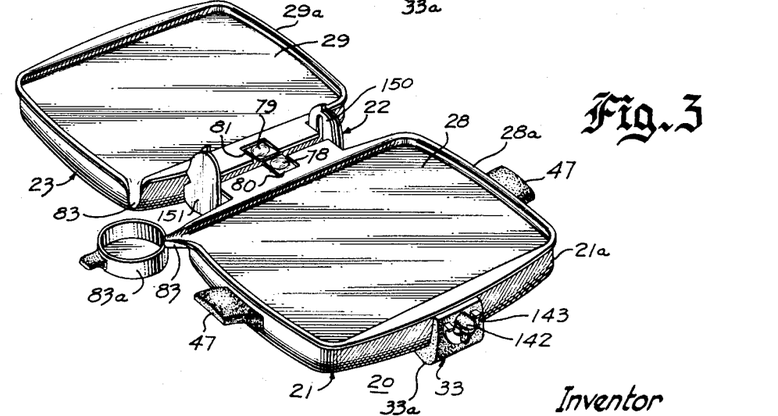
Fig. 3 is a view similar to Fig. 2 with the waffle grids of Fig. 2 replaced by grill plates.

Referring now to the drawings, there is illustrated a combined waffle baker and grill of the present invention, which is designated generally by the reference numeral 20 in Figs. 1, 2 and 3 of the drawings. Fig. 2 of the drawings shows this device with the waffle grids in position for use as a waffle baker, and Fig. 3 shows the device with the waffle grids replaced by grill plates. As illustrated, the combined waffle baker and grill resembles a conventional waffle baker in many respects. It comprises a lower case or base 21 of substantially square or rectangular configuration, which is hingedly related as by a hinge mechanism designated generally by the reference numeral 22 with an upper case 23 also of generally rectangular configuration. The general shape and functions of the lower and upper cases 21 and 23, respectively, are very similar to the corresponding parts in the above-mentioned Jepson patent. Associated with the upper and lower cases 21 and 23 are radiant heating elements, generally designated as 24 and 25, respectively, which elements heat removable waffle grids designated as 26 and 27 in Fig. 2 of the drawings, or removable grill plates 28 and 29 best shown in Fig. 3 of the drawings. To control the heating of the grids 26 and 27 or the grill plates 28 and 29, as the case may be, there is provided in accordance with the present invention an improved temperature responsive control means generally designated by the reference numeral 30.

Figure 4:
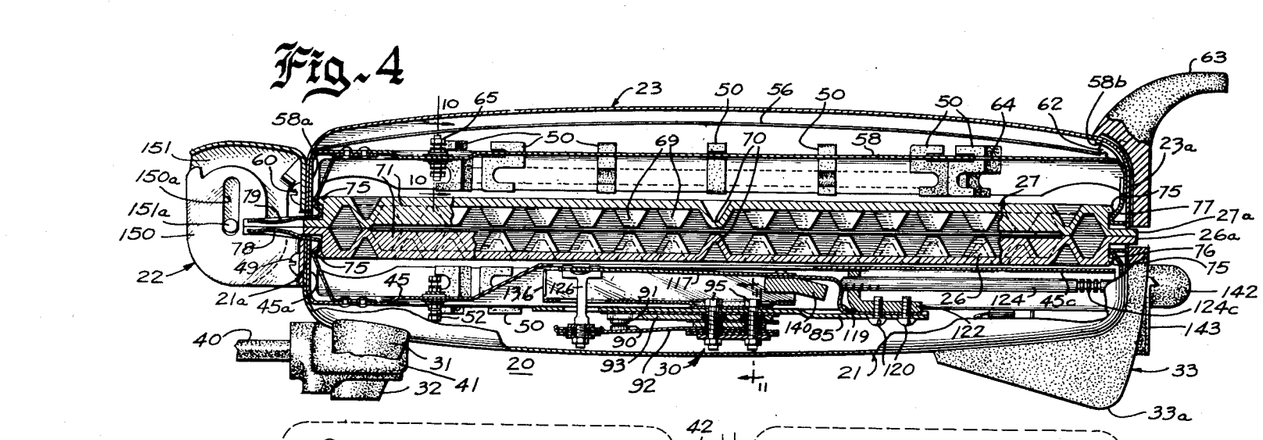
Fig. 4 is an enlarged sectional view taken generally on line 4—4 of Fig. 1, but with certain portions not fully cut away better to illustrate certain constructional details.
Figure 6:
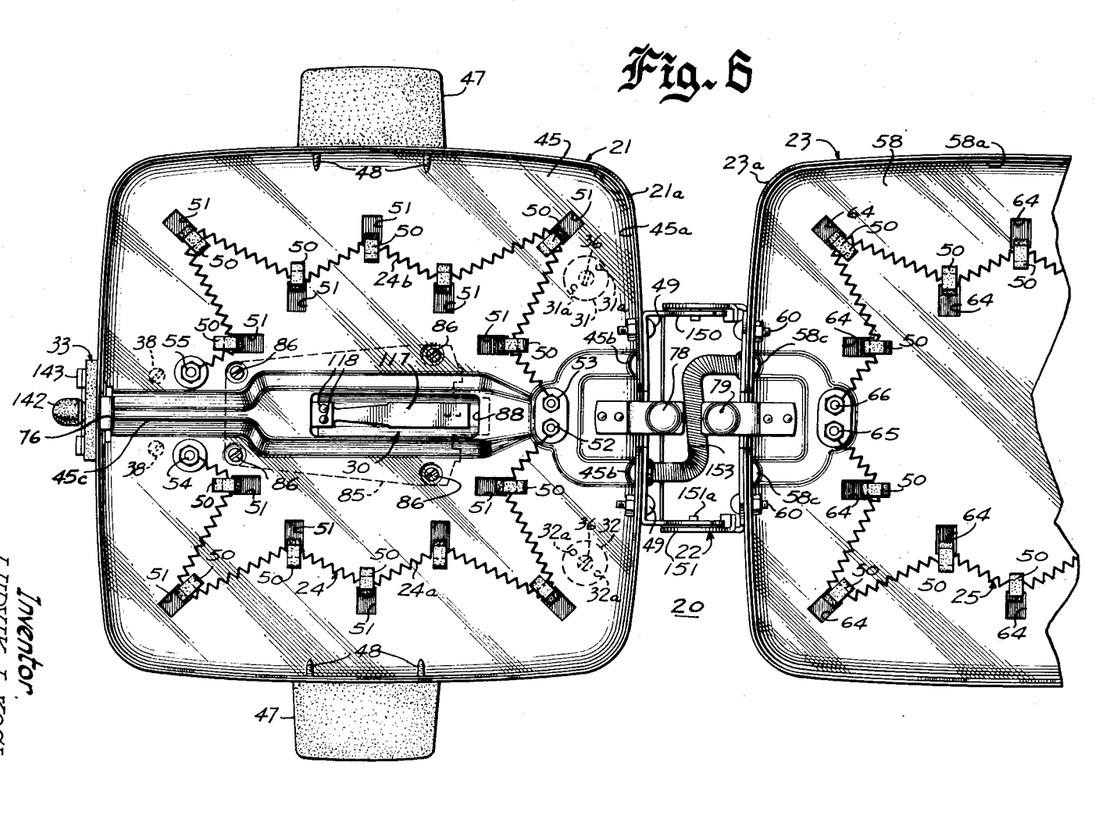
Fig. 6 is an enlarged top plan view of the waffle baker of the present invention in the position of Fig. 2 of the drawings with a portion thereof cut away and with the interchangeable waffle grids or grill plates removed.
Figure 7:
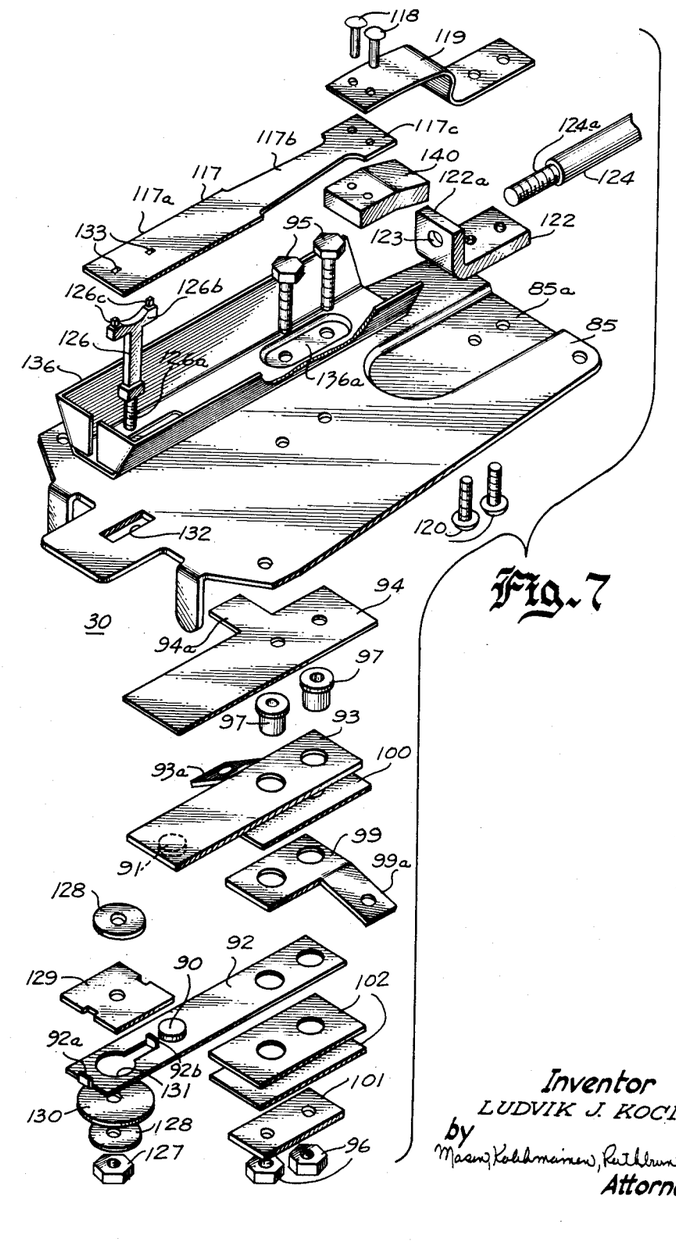
Fig. 7 is an exploded perspective view of the temperature responsive control device employed in the combined waffle baker and grill of the present invention.
Figure 12:
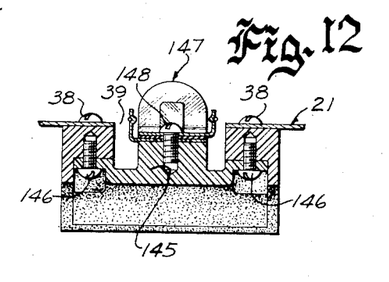
Fig. 12 is a somewhat enlarged sectional view taken on line 12—12 of Fig. 8, further assuming that Fig. 8 shows the complete structure.

Considering, first, the lower case 21, best shown in Figs. 4 and 6 of the drawings, it comprises a somewhat pan-shaped construction having an integral upstanding peripheral wall portion or rim 21a thereby to define a receptacle. The lower case essentially acts as a supporting means or base portion for the waffle baker and grill combination. To this end it has secured to the bottom thereof suitable legs or supporting means for supporting the same from a suitable surface such as a counter top, table top or the like. As specifically illustrated in the drawings, the supporting means comprises a three-point support including a pair of legs 31 and 32 secured to the rear or hinge side of the lower case 21, and a single center leg or support 33a, which center leg or support forms a part of a control dial bracket 33 described in greater detail hereinafter. Preferably, the legs 31 and 32 and the control dial bracket 33 are formed of a suitable molded insulating material such as a phenolic resin or the like. The legs 31 and 32 are preferably secured to the lower case 21 as by suitable screws 36 (Fig. 6) engaging a threaded opening in the legs 31 and 32 disposed along the longitudinal axes thereof. In order that a single screw or fastening means 36 may firmly secure the legs 31 and 32 to the lower case 21, these legs are preferably provided with a pair of spaced protrusions 31a and 32a for the legs 31 and 32, respectively, which extend through suitable openings in case 21 defined on either side of the openings for receiving the screws 36. The control dial bracket is similarly secured to the front center bottom of the case 21 as by a pair of screws or fastening means 38 (Figs. 6 and 12). The lower case is also provided with a relatively large opening 39 between the screws or fastening means 38. The screws or fastening means 36 and 38 extend from the inside of the lower case to the outside. It will be understood that the insulated feet or legs 31 and 32 and the center supporting leg 33a, formed as a part of the control dial bracket 33, suitably space the bottom of the case 21 from any supporting surface so that this surface will not be damaged by the high temperature to which the case 21 may be heated.

For the purpose of supplying electrical energy to the heating elements 24 and 25, there is provided a suitable power cord 40 having one end terminating in an insulating housing 41 suitably secured to the lower case 21. The other end of the power cord 40 preferably terminates in the conventional plug-in type contact 42. Preferably, insulated electrical conductors 43a and 43b extend from the insulated housing 41 through suitable openings into the lower case 21.

To provide a heat reflecting surface and to support the heating element 24 disposed within the lower case 21, there is provided a reflector plate assembly comprising reflector plate 45 having a configuration somewhat like that of lower case 21. This reflector plate 45 has an upwardly extending peripheral flange 45a which is adapted to abut the peripheral upstanding flange 21a of case 21 so that the plate 45 may be secured to case 21 in the position shown in Fig. 4 of the drawings by suitable fastening means extending through the upstanding flanges 21a and 45a of the lower case 21 and reflector plate 45, respectively.

In order that the user may readily carry the combined waffle baker and grill whether hot or cold, there are secured, one to each side of the lower case, a pair of handle members 47. These handle members 47, preferably formed of a molded plastic such as a phenolic resin or the like, are secured to the lower case 21 by suitable screws or fastening means 48 which extend through aligned openings in the peripheral flange 21a and in the peripheral flange 45a of the reflector plate 45. Preferably, self-tapping screws are used for this purpose. It will be appreciated that the means for securing the handles 47 to the lower case 21 simultaneously secure the reflector plate 45 in position in lower case 21. In addition, suitable bolts 49, which secure the hinge mechanism 22 to the lower case 21, perform a similar function of securing the reflector plate 45 to the lower case 21.

For the purpose of supporting the lower heating element 24 in insulated relationship with respect to the reflector plate 45, there are provided a plurality of S-shaped ceramic brackets 50, best shown in Figs. 4 and 6 of the drawings. The reflector plate is provided with a plurality of rectangular openings 51, and the lower portions of the S-shaped brackets 50 hook over one edge of the reflector plate defining the corresponding opening 51, as is best shown in Fig. 4 of the drawings. The upper portions of the S-shaped brackets are adapted to receive the heating element 24, which is preferably a springlike heating element coiled in spiral form. The particular direction in which the notch defined in the upper portion of the S-shaped ceramic brackets extends depends upon whether the particular bracket tends to pull the springlike heating element 24 toward the center of the reflector plate 45 or toward the outside. By means of the plurality of S-shaped brackets the heating element may be disposed in the configuration clearly shown in Fig. 6 of the drawings, which has been found to be very satisfactory to insure uniform heating by reflection of either the lower waffle grid 26 or the grill plate 28, as the case may be. It will be apparent that the springlike heating element 24 when positioned as indicated in Fig. 6 of the drawings biases the S-shaped ceramic brackets into assembled relationship with the reflector plate 45. Thus, there is provided a very simple means for assembling the heating element in insulated relationship with the reflector plate 45. Actually, the lower heating element 24 is divided into two separate parts, designated as 24a and 24b, respectively. One terminal of the portion 24a is connected to a terminal connector 52 supported on reflector plate 45 in insulated relationship therewith. The corresponding terminal of the heating element 24b is connected to a similar terminal connector 53. Likewise, the opposite ends of the heating element sections 24a and 24b are connected to terminal connectors 54 and 55, respectively, supported in like manner to connectors 52 and 53. It will be apparent that in assembly of the heating element 24 to the reflector plate 45, the sections 24a and 24b may have their ends suitably secured to their respective terminal connectors 52, 53, 54 and 55, after which the intermediate portions thereof may be positioned in the supporting brackets 50 in the manner clearly disclosed.

To accommodate certain electrical conductors, as will be pointed out hereinafter, the lower reflector plate includes certain deformations, such as a deformation 45b. It also includes a large central deformation 45c to accommodate the temperature responsive control means 30, also described in greater detail hereinafter.

The upper case 23 and associated parts are in many respects very similar to the lower case already described. The upper case 23 is provided with a depending peripheral flange or rim portion 23a to define a receptacle similar to the receptacle defined by the lower case 21. For the purpose of decreasing the heat transmitted outside the upper case 23, there is mounted therein a heat shield 56 preferably in the form of an aluminum foil. It is merely inserted into the upper case and maintained in position between the case 23 and a reflector plate 58. The function of the heat shield 56 is to reduce the heat radiation and convection with respect to the upper case 23. Mounted within the upper case is the reflector plate 58, which may be very similar to the reflector plate 45 described above. This reflector plate also has a peripheral rim 58a, which rim or flange abuts with the flange or wall portion 23a of the upper case 23. As in connection with the lower case, the reflector plate 58 is secured to the lower case 21 by bolts 60 which secure the hinge mechanism 22 to the upper case and simultaneously secure the reflector plate 58 to the upper case 23 by virtue of extending through the abutting integral flanges 23a and 58a, respectively. The reflector plate 58 is further secured to the upper case 23 by means of screws 62 which extend through the upper case 23 and through integral ears or deformations 58b of the reflector plate 58. These screws preferably engage tapped openings in a handle 63 preferably formed of a molded insulating material such as a phenolic resin or the like. This handle is illustrated as having a curved configuration so it may readily be grasped by the operator in manipulating the upper case 23 relative to the lower case 21. Also, as illustrated best in Fig. 1 of the drawings, it preferably has a configuration so that it looks like an extension of control dial bracket 33. It will, of course, be appreciated that the particular configuration of the handle 63 and the bracket 33 forms no part of the present invention, but forms a feature of the design invention embodied in the instant combined waffle baker and grill as disclosed and claimed in copending Ernest design application, Serial No. D. 35,274, filed March 30, 1955, now Patent No. D. 179,630, issued February 5, 1957, and assigned to the same assignee as the present application.

As in the case of the lower reflector plate 45, the upper reflector plate 58 supports in a similar manner the heating element 25. The reflector plate 58 is provided with a plurality of rectangular openings 64, spaced in a predetermined manner over the surface of the reflector plate to receive the S-shaped ceramic supports 50 identical with those used in connection with the lower reflector plate 45. In this case the resistance element 25 is continuous and the ends are secured to suitable terminals 65 and 66 supported by the reflector plate 58 in insulated relationship therewith. As in the case of the lower reflector 45, the upper reflector 58 is also provided with deformations 58c to provide a space for electric wiring connected to the terminals 65 and 66, as will be brought out in greater detail hereinafter.

In order that the heat produced by the heating elements 24 and 25 may be used to perform a waffle baking operation, the combination waffle baker and grill of the present invention is provided with lower and upper waffle grids 26 and 27, as mentioned above. These grids are preferably made of cast aluminum, and the cooking surfaces thereof are of conventional design, being provided with a plurality of uniformly spaced, truncated pyramids 69, which form the well-known waffle pattern. Preferably these pyramids are arranged into four sections divided by a pair of raised ridges disposed at right angles to each other and designated by the reference numerals 70 and 71, respectively. The waffle grids 26 and 27 are illustrated as being provided with a peripheral recess 72 into which excess batter may flow thereby eliminating the undesirable flow of excess batter from between the upper and lower cases and down along the outside thereof.

To support the grids 26 and 27 in position in the appropriate lower and upper cases 21 and 23, respectively, each grid is provided with a peripheral flange designated as 26a and 27a for the grids 26 and 27, respectively. This flange is adapted to rest against the edge of the rim portion 21a or 23a, as the case may be, thereby properly positioning the grids, as is clearly indicated in Fig. 4 of the drawings.

For the purpose of securing the waffle grids 26 and 27 in position, each grid is provided on the lower edge of the front and rear portions with a small proturberance designated as 75 for cooperating with suitable latch means associated with the upper and lower cases 23 and 21, respectively. Supported in the cases 21 and 23, and specifically secured to the rims 45a and 58a of the lower and upper reflector plates 45 and 58, respectively, are fixed latches 76 and 77, respectively. These latches are welded to the reflector plates so that when the reflector plates are secured to their respective cases they become a fixed part of the associated case. These latches are provided with inwardly directed latching means to engage with the proturberances 75 provided on the adjacent portion of the waffle grids.

To releasably secure the rear portions of each of the grids 26 and 27, each reflector plate has secured thereto movable and releasable latch members designated as 78 and 79, respectively, the latch member 78 being secured to the lower reflector plate 45, while the latch member 79 is secured to the upper reflector plate 58. Each latch member 78 and 79 is of somewhat Z shape, with the one horizontal portion of the Z secured to the reflector plate and the other horizontal portion comprising a manually engageable latch releasing portion. At the junction of the manually engageable latch releasing portion, there is provided a hook-shaped portion which, as is clearly shown in Fig. 4 of the drawings, readily engages with the associated protuberances 75 defined on the waffle grids 26 and 27, respectively. By virtue of the resilient nature of the latch members 78 and 79, the manually engageable portion can readily be actuated to release the associated grids from the cases 21 or 23. As illustrated, the grid 26 is provided with an extension 26b at the rear thereof which is provided with a notch 80 through which the latch releasing portion of latch 78 protrudes. Similarly, the waffle grid 27 is provided with an extension 27b including a notch 81 through which the latch releasing portion of latch 79 may protrude. This is best shown in Fig. 2 of the drawings.

It will be appreciated from the above description that the waffle grids 26 and 27 are supported in spaced relationship with respect to the heating elements 24 and 25, respectively, as is best shown in Fig. 4 of the drawings. In order that these waffle grids may absorb the maximum amount of radiation, the sides thereof adjacent the heating elements 24 and 25 are provided with blackened surfaces. Also as mentioned above, the cooking surface of each waffle grid is preferably coated with a suitable silicone glaze to eliminate sticking of the waffles thereto.

Figure 13:
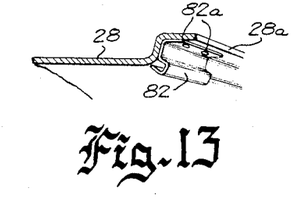
Fig. 13 is a fragmentary view of a portion of a grill plate to illustrate the details of a latch mechanism for latching the same in position in the combined waffle baker and grill of the present invention.

In order that the waffle baker may be converted to a cooking grill, the waffle grids 26 and 27 are readily removable as described above and are replaceable by grill plates 28 and 29, best shown in Figs. 2 and 13 of the drawings, which are flat plates preferably formed of aluminum having a slightly raised peripheral edge, each terminating in a laterally projecting flange 28a and 29a serving the same purpose as the flanges 26a and 27a of the waffle grids 26 and 27 in that they are adapted to rest against the edges of the rim portions 21a and 23a of the lower and upper cases 21 and 23, respectively. These raised peripheral flanges 28a and 29a of the grill plates 28 and 29 are each interrupted at one point, preferably at adjacent corners, to provide integrally formed grease spouts designated as 83 in Fig. 3 of the drawings. With the grease spouts disposed at adjacent corners, a single container such as 83a may be disposed beneath both grease spouts 83 to receive any excess grease. As in the case of the waffle grids 26 and 27, the surfaces of the grill plates 28 and 29 adjacent the heating elements 24 and 25 are blackened for maximum radiation absorption. Also, the grill plates have secured thereto at the flange portions 28a or 29a, both at the front and rear thereof, latch members such as 82, best shown in Fig. 13 of the drawings, to cooperate with the fixed latching means 76 and 77 and the releasable latching means 78 and 79 in the same manner as the corresponding portions 75 of the waffle grids 26 and 27. Preferably, these latch members 82 are secured to the associated grill plates as by suitable rivets 82a or the like.

In order to provide adequate and accurate temperature control to insure uniform temperature of the waffle grids 26 and 27 or the grill plates 28 and 29, as the case may be, there is provided in accordance with the present invention the temperature responsive control means generally designated at 30, which, without being in heat transfer relationship with either the waffle grids or the grill plates, insures accurately controlled temperature of the cooking surfaces under all conditions. As illustrated, the temperature responsive control means 30 comprises a subassembly preferably supported from the reflector plate 45 associated with the lower case 21. As illustrated, this assembly includes a mounting plate 85 which is adapted to be secured to the lower face of the reflector plate 45 by a plurality of screws designated as 86. With this arrangement, the mounting plate 85 is mounted beneath the raised portion 45c of the reflector plate, which raised portion defines some sort of a housing for the temperature control means mounted on the supporting plate 85. Actually, the raised portion 45c is provided with an enlarged opening 88 for exposing the temperature responsive means so that it may be responsive to heat radiated from the blackened surface of the associated waffle grid 26 or grill plate 28, as the case may be. The raised portion 45c, moreover, is sufficiently high so that this opening 88 is above the level of the heating element 24. Thus, direct radiation from the heating element 24 into the opening 88 is impossible. The temperature responsive device housed within the raised portion 45c above the supporting plate 85 is completely shielded from direct radiation from the heating element 24, as will become apparent from the following description.

Since the temperature responsive device 30 must control the temperature attained by the associated cooking surfaces, it includes a switch for interrupting the current to the heating elements when the temperature thereof reaches a predetermined value. In the other words, temperature is controlled by interrupting the heating current when the temperature is sufficiently high and permitting the heating current to flow when the temperature falls below a predetermined value. Accordingly, there is mounted on the mounting plate 85 a suitable control switch comprising relatively movable contacts 90 and 91. The contact 90 is illustrated as being mounted on a resilient contact arm 92, while the contact 91 is illustrated as being mounted on a relatively rigid conducting arm 93. Consequently, the contact 91 may be considered the stationary contact, while the contact 90 may be considered the movable contact of the control switch. Preferably, the conducting arm 93 supporting the contact 91 is supported from the mounting plate 85 and directly below the same. Moreover, it is insulated therefrom by a suitable sheet of insulating material 94, which may be mica or other similar insulating material which will withstand the high temperatures involved. Actually, the contact arms 92 and 93 are preferably mounted in an assembly or stack of interposed conducting and insulating members secured to the mounting plate 85 as by suitable screws 95 to which are threadedly attached the nuts 96. Thus, the insulating plate 94, the rigid arm 93, and the resilient arm 92 are provided with suitable openings to accommodate the bolts 95. Moreover, to insulate the conducting arms 92 and 93 from the fastening means 95, there are provided a pair of insulating spools or cylinders 97 which are adapted to extend through cooperating openings in the elements 92 and 93.

To provide an electrical terminal through which electrical connection with the stationary contacts 91 can be made, the conducting member 93 is preferably provided with a lateral integral projection 93a having a suitable opening therein to which an electrical circuit may be connected as by a conventional connector 98a. To insure that this electrical terminal 93a and connector 98a are insulated from the mounting plate 85, the insulating plate 94 is preferably provided with an extension 94a which is thus always interposed between the terminal 93a and the mounting plate 85. To permit making electrical connection with the resilient contact arm 92, there is provided a contact element 99, illustrated as of L shape, which may be welded or otherwise secured to the resilient element 92. This conducting member 99 is provided with cooperating openings to receive the insulating sleeves 97 and includes the lateral projection 99a having a suitable opening to which an electrical circuit may be made as by a conventional connector 98b. Interposed between the member 99 and the conductor 93 for electrically insulating the contact arms 92 and 93 is an insulating member 100, which is also provided with suitable openings to accommodate the sleeves 97. The stack of interposed conducting and insulating members is completed by a metal clamping plate 101 and interposed insulating members 102, which insulating members 102 function to insulate the clamping plate 101 from the resilient conducting member 92. It will be apparent, as is best shown in Fig. 4 of the drawings, that the screws 95 and associated nuts 96 hold the whole switch assembly in position on the supporting plate 85, with the contact supporting members 92 and 93 electrically insulated from each other and from other conducting parts.

Figure 5:
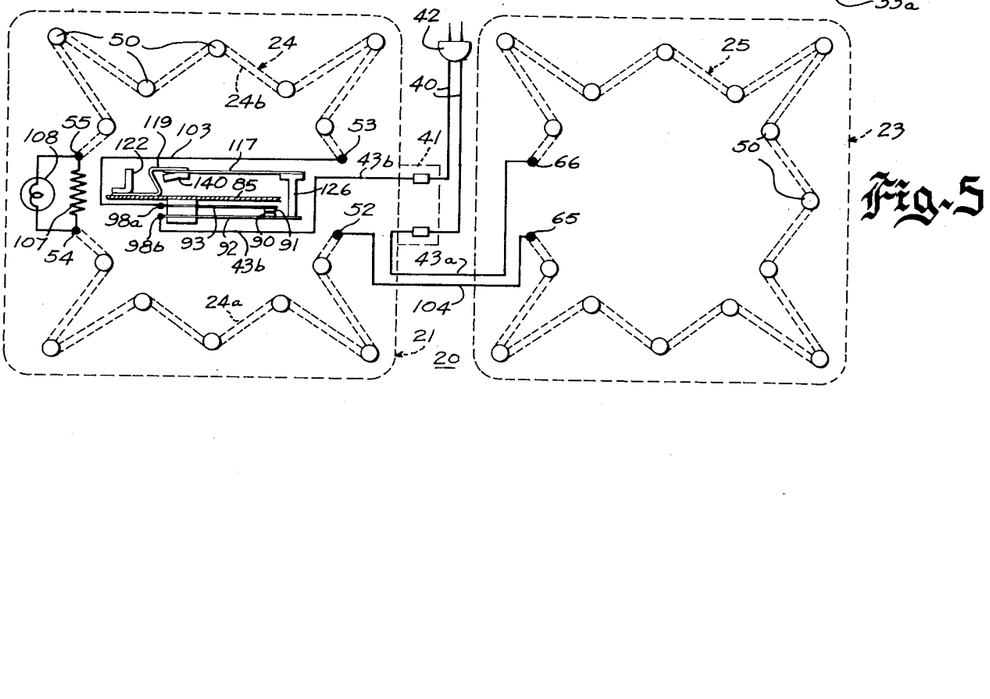
Fig. 5 is a somewhat schematic diagram illustrating the electrical circuit of the combined waffle baker and grill of the present invention.

The electrical circuit of the combined waffle baker and grill 20 can now be considered before going into a detailed description of the temperature responsive device, and in this connection reference may be had to Fig. 5 of the drawings where the corresponding parts, somewhat in schematic form, are designated by the same reference numerals as in the other views of the drawings. As there illustrated, the terminal 98a electrically connected to the stationary contact 91 is connected by means of a conductor 103 with the terminal 53 of the heating element 24, and the terminal 98b electrically connected to the movable contact member 90 is connected by conductor 43b with one of the leads in power cord 40. Similarly, the terminal 52 is connected by a conductor 104 with the terminal 65. The conductors 43a and 104 are illustrated as extending between the cases 21 and 23.

The terminals 54 and 55 of the lower heating element 24 are interconnected by means of a resistor 107 which has a relatively low resistance value of the order of a fraction of an ohm. To make sure that this resistor is fully insulated from the reflector 45, a bridge of insulating material 105, best shown in Figs. 8 and 9 of the drawings, extends across the channel 106 defined by the raised portion 45c near the forward portion of the waffle baker. In a specific embodiment built in accordance with the present invention, the resistance value of the resistor 107 was about one-fifth of an ohm. With this arrangement, a signal light such as 108 connected across the resistor 107 will be lit when current flows through the resistor 24, since the voltage drop across resistor 107 will be sufficient to energize the signal light 108. It will be apparent that the terminals 52, 53, 54, 55, 65 and 66 provide a simple means for making electrical connections with the heating elements 24 and 25 and yet are insulated from the reflector plates 45 or 58, as the case may be.

Figure 9:
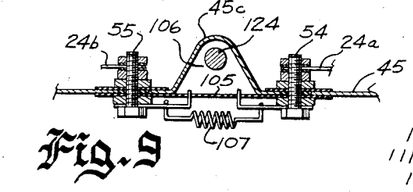
Fig. 9 is a sectional view taken on line 9—9 of Fig. 8, assuming that Fig. 8 shows the complete structure.
Figure 10:
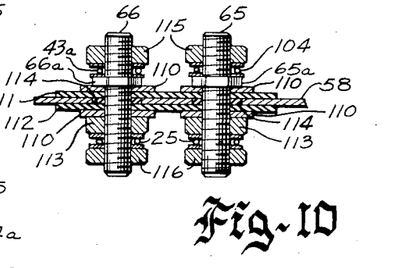
Fig. 10 is a somewhat enlarged sectional view taken on line 10—10 of Fig. 4, assuming that Fig. 4 shows the complete structure.
Figure 11:
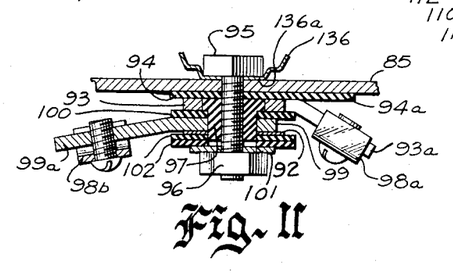
Fig. 11 is an enlarged sectional view taken on line 11—11 of Fig. 4, again assuming that Fig. 4 shows the complete structure.

In Fig. 10 of the drawings, two of these terminals 65 and 66, which are also representative of the terminals 52 and 53, are shown in detail. The terminals 54 and 55, which are slightly different, are clearly disclosed in Fig. 9 of the drawings. It is noted that the terminals 65 and 66 each comprise a bolt having a head portion 65a or 66a, as the case may be, intermediate the ends thereof with a threaded portion extending from each side of the head portion. One threaded portion extends through the associated reflector plate such as 45 or 58 and is suitably insulated therefrom by insulating plates 111 and 112. Suitable washers 110 and the nuts 113 enable the terminals such as 65 and 66 to be secured to the reflector plate 58 in insulated relationship, a sleeve 114 preferably surrounding the portion of each terminal passing through the opening in the reflector plate. Suitable nuts 115 may then be employed to clamp the conductors 104 and 43a to the adjacent ends of the terminals 65 and 66, respectively. Similar pairs of nuts 116, associated with the other ends of the terminals 65 and 66, permit clamping the ends of the heating element 25 thereto. The operation of the heating circuit will now readily be understood. With the switch comprising contacts 90 and 91 closed and with the plug connector 42 connected to a source of power, current will flow through the switch contacts and through the heating elements 24 and 25 in series. The signal light 108 will be energized as long as current flows through these heating elements. By means of the thermal control means described hereinafter, the circuit is made and interrupted at the switch contacts 90 and 91 whenever the temperature of the waffle grids or grill plates, as the case may be, moves outside a narrow predetermined temperature range.

Figure 8:
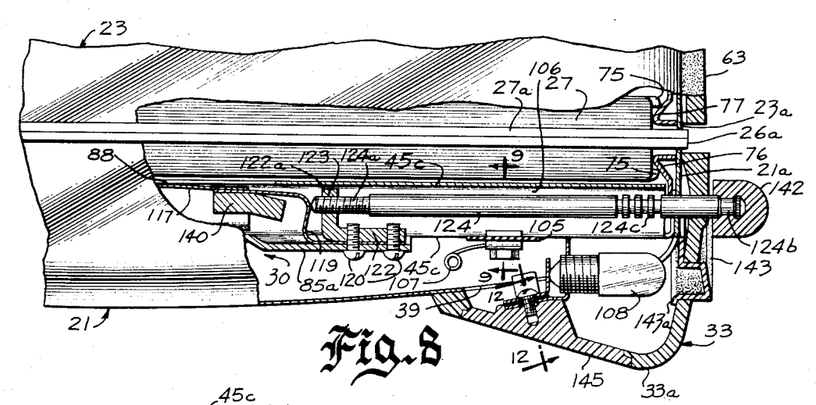
Fig. 8 is a fragmentary side elevational view of the waffle baker of the present invention with certain portions thereof cut away better to illustrate certain details of the present invention.

In accordance with the present invention, there is provided a bimetallic element 117 of somewhat novel form which is constructed and mounted so that compensation or correction of temperature changes of the surrounding elements is produced within the body of the element 117 itself. The bimetallic element 117 is preferably one of the species of the generic invention described and claimed in United States Letters Patent 2,332,518, Koci, granted October 26, 1953, and assigned to the same assignee as the present application. The principle of operation of this type of thermostat is explained in detail in the above-mentioned Koci patent as well as Koci Patents 2,390,947 and 2,390,948, which are a divisional case and a continuation-in-part case, respectively, of the parent case now Patent 2,332,518. Specifically, the bimetallic element or thermostat 117 is a strip of nonuniform cross section having a section 117a of about one-half the length thereof of uniform cross section and a section 117b of somewhat tapering cross section terminating in a short mounting portion 117c. The mounting portion 117c of the bimetallic element 117 is secured as by rivets 118 to one end of a resilient S-shaped member 119, having the other end thereof secured as by screws 120 to the mounting plate 85. Actually, and as will become apparent from the following description, the resilient S-shaped support 119 comprises part of a means for adjustment of the temperature of operation of the bimetallic element 117. The screws 120 preferably threadedly engage tapped openings in an L-shaped control rod mounting bracket 122. The portion of the S-shaped resilient support 119 clamped to the mounting plate 85 is preferably disposed within a recess defined by deforming the mounting plate 85 as indicated at 85a. The resilient support 119 is, therefore, held in good heat conducting relationship with the mounting plate 85 by the L-shaped bracket 122, which bracket has a leg portion 122a thereof extending in a vertical direction somewhat parallel to the intermediate portion of the S-shaped support 119, as best shown in Fig. 4 of the drawings. A tapped opening 123, defined within the leg 122a, is adapted to receive a threaded portion 124a of a manually adjustable control rod 124. This control rod, as is best shown in Figs. 4, 8 and 9 of the drawings, is adapted to extend from the bracket 122 in a generally horizontal direction within the channel 106 defined by the raised portion 45c of the reflector plate 45. The end of the control rod 124 remote from bracket 122 extends outside the case 21 through an opening defined in control dial bracket 33. Upon rotating the control rod 124 in one direction, it will engage the intermediate portion of the S-shaped resilient bracket 119, as shown in Figs. 4 and 8 of the drawings, thereby permitting deformation of the resilient member 119 to change the angle of the portion of the resilient S-shaped member 119 secured to the mounting portion 117c of the bimetallic element 117, and consequently varying the temperature control effected by the bimetallic element 117, as will become apparent from the following description.

In order to relate the bimetallic element 117 with the switch comprising contacts 90 and 91, there is provided an interconnecting rod or post 126 having a threaded end 126a which is secured in insulated relationship with the resilient arm 92 as by means of nut 127, washers 128, and insulating plates or washers 129 and 130. As illustrated, the resilient arm 92 is provided with projecting tabs 92a and 92b cooperating with suitable notches in insulating plate or washer 129. These tabs 92a and 92b may be deformed to hold the insulating plate 129 in position, which insulating plate has a relatively small opening compared to a relatively large opening 131 defined in the resilient arm 92, thereby insuring proper insulation between resilient arm 92 and post 126. It will be understood that the plate 85 is provided with a suitable opening 132 to accommodate movement of the post 126.

For the purpose of securing the upper portion of the post 126 to the end of bimetallic element 117, and specifically to the free end of portion 117a thereof, this post is provided with a bifurcated portion 126b including a pair of posts 126c which extend through spaced openings 133 and bimetallic element 117. The ends are then peened over to insure a firm connection between post 126 and bimetallic element 117. With this arrangement, an angular restraint may be placed on this end of the bimetallic element 117. It is desired to maintain the actual contact area between post 126 and bimetallic element 117 at a minimum, which can be accomplished with the bifurcated construction illustrated and yet at the same time provide a very firm connection between the two.

To insure satisfactory operation, the portion 117a of the bimetallic element 117 is blackened to form a heat absorbing surface so that the maximum amount of heat radiated from the adjacent grids or grill plates, as the case may be, is received by the bimetallic element. Furthermore, to make use of the maximum amount of this reflected heat, a channel-shaped heat collector 136 is provided substantially enclosing three sides of the bimetallic element 117. This heat collector 136 is preferably formed of a reflecting material and is illustrated as being secured to the mounting plate 85 by the screws 95 which hold the switch mechanism described above in assembled relationship. Obviously, the open end of the heat collector 136 is directed upwardly. In order to reduce the heat conduction between mounting plate 85 and the heat collector 136, the latter is provided with a depressed portion 136a adjacent the openings for the fastening means 95, thereby slightly raising the main body of the heat collector 136 above the mounting plate 85, as is clearly shown in Fig. 4 of the drawings.

The lower side of the bimetallic element 117 is the high expansion side, and heat transfer through the S-shaped mounting bracket 119 from the mounting plate 85 to the bimetallic element 117 tends to close contacts 90 and 91 by causing the two ends of the bimetallic element 117 to curl upwardly, as viewed in Fig. 4 of the drawings. This tendency to close the contacts 90 and 91 is reduced by providing the reduced cross section in portion 117b. As explained in the above-mentioned Koci patents, the main part or portion 117a of the bimetallic element 117 will tend to become concave downward because of the longitudinal end restraints thereof, which curvature will tend to open the switch comprising contacts 90 and 91. In operation this temperature control device has been found to maintain a constant temperature of the waffle grids or the grill plates even though the space between the bimetallic element 117 and the grids or grill plates is variable. As a matter of fact, the design of the waffle grids and grill plates is such that the grill plates are spaced a greater distance from the bimetallic element 117 than is the heat absorbing surface of the grill plates. In spite of this, accurate temperature control to substantially the same temperature is obtained, and the problem existing in prior art devices of maintaining good temperature control by insuring good contact of the controlled surface with a bimetallic element is completely obviated.

A very satisfactory load characteristic is also obtained by virtue of the fact that the bimetallic element 117 is completely compensated within itself for ambient temperatures. In prior art arrangements, the bimetallic element in contact with the waffle grids or grill plates was still responsive to a substantial extent to the ambient temperature and, hence, gave a poor load characteristic. With the present invention, the load characteristic is found to be very satisfactory, producing only a very small temperature differential as between substantially no load and full load operation.

For the purpose of providing satisfactory control when the waffle baker or grill is first connected to a source of power until steady state temperature conditions are obtained, there is provided a thermal mass 140 which is mounted to the resilient bracket 119, preferably by the same rivets or fastening means 118 which secure the resilient bracket to the bimetallic element 117. This thermal mass 140 is provided to match the lag between the portion 117a of the bimetallic element and the waffle grids or grill plates, as the case may be. Thus, this thermal mass 140 slows down the compensating action of the bimetallic element 117, which, in turn, allows for the above-mentioned temperature lag between the portion 117a of the bimetallic element and the waffle grids or grill plates.

In order that the shaft 124 may be manually manipulated, the end thereof which projects out of lower case 21 through an opening in the control dial bracket 33 has secured thereto a suitable control knob 142. Preferably, this control knob may be secured to the shaft end 124b by a suitable set screw, or like knurled portions 124b may be provided on the end of shaft 124 secured to knob 142 cooperating with a similar knurled surface defined in the shaft receiving recess in the knob 142, so that the knob may be attached to the shaft at any desired relative angular position to insure proper calibration thereof. The rod 124 may be provided with a series of sections of restricted cross section, as indicated at 124c, to reduce heat conduction along the length thereof.

The control dial bracket 33 is provided in its forward wall with an arcuate slot concentric with the control shaft 124. Mounted within this arcuate slot is a control dial 143 which is insertable from the rear through this arcuate slot and is provided with suitable shoulders 143a to prevent it from being pushed through. This control dial is maintained in position, since it is disposed between the rim 21a of the lower case 21 and the bracket 33 when the latter is secured to the lower case by the fastening means 38. Suitable index markings are preferably inscribed on the face of the control dial 143, and the signal light 108 is disposed behind the control dial, so that the signal light may be observed through the control dial, which latter is preferably made of a translucent material such as nylon or the like.

To afford ready access to the signal light for changing the same in the event that replacement is necessary, the control dial bracket 33 is preferably open at the bottom and is closed by means of a suitable closure plate 145 secured thereto by suitable fastening means 146. Preferably, a signal light support 147 is provided which is secured as by the screw 148 to the closure 145, so that when the closure 145 is removed, ready access to the signal light is provided. The electrical circuit for the signal light 108 can readily be made to the support 147, which is illustrated as a two-part support with the two parts electrically insulated from each other.

The hinge mechanism 22, generally described above, comprises a lower hinge member 150 and an upper hinge member 151. The upper hinge member includes a bracket portion for securing the same to the upper case 23 by the fastening means 60. Similarly, the lower hinge member 150 includes a bracket portion by means of which it is secured to the lower case 21 by the screws 49. As illustrated, the upper hinge member includes a pair of diametrically opposed inwardly directed trunnions 151a which are adapted to be received in elongated slots 150a defined in the lower hinge member 150. The slots 150a are disposed in a generally vertical direction whereby the upper case 23 may pivot about the trunnions 151a and also may be moved vertically to the extent permitted by the length of the slots 150a. Thus, with this type of hinge 22, the material being cooked may be permitted to occupy a varying space between the grids or grills, as the case may be, and yet insuring contact of both heating surfaces with the material being cooked when the grill is in the position generally indicated in Figs. 1, 4 and 8 of the drawings. To protect the electrical conductors 43a and 104 extending between the lower case 21 and upper case 23, there is supported in hinge mechanism 22 a tubular shield 153 formed of coiled spring material which houses these conductors. It will be understood that the deformations 45b and 58c define passageways for conductors such as 43a, 104 and the like.

In view of the detailed description included above, the operation of the combined waffle baker and grill unit of the present invention will readily be understood by those skilled in the art. When it is desired to convert the waffle baker to a grill, the operator merely releases the latch members 78 and 79 and removes the waffle grids 26 and 27, which are then replaced by the grill plates 28 and 29. By virtue of the improved temperature control means of the present invention completely out of contact with the cooking surfaces, accurate temperature control is maintained whether operating as a grill or as a waffle baker. Moreover, this temperature control is maintained with excellent regulation.

While there has been illustrated and described what is at present believed to be the preferred embodiment of the present invention, numerous changes and modifications will occur to those skilled in the art, and it is aimed in the appended claims to cover all such changes and modifications as fall within the true spirit and scope of the present invention.

What is claimed as new and desired to be secured by Letters Patent of the United States is:

1. An electric cooking appliance comprising a pair of hingedly related cases, a pair of reflector plates one secured to each of said cases, a pair of radiant heating elements one supported on each of said reflector plates, means defining a first cooking surface overlying one of said cases, a first latch means for releasably securing said means defining said first cooking surface in position, means defining a second cooking surface overlying the other of said cases, a second latch means for releasably securing said means defining said second cooking surface in position, and temperature responsive means mounted within one of said cases and responsive solely to radiation from one of said cooking surfaces for maintaining the temperature of said cooking surfaces within a predetermined range, said temperature responsive means being wholly out of physical contact with any part of the means defining said one of said cooking surfaces.

2. The cooking appliance of claim 1 wherein said first and second cooking surfaces comprise waffle grids.

3. The cooking appliance of claim 1 wherein said first and second cooking surfaces comprise grill plates.

4. In combination with a cooking device having a pair of separate heating surfaces, means for supporting said heating surfaces for movement between two positions in one of which said heating surfaces are superimposed with opposed heating surfaces adjacent and separated by the thickness of material to be cooked disposed therebetween and in another of which said heating surfaces are disposed relatively far apart but in substantially the same plane with said heating surfaces facing in the same direction, electric heating means for heating said surfaces, switch means for controlling said electric heating means, reflector plates supported by said first mentioned means and in turn supporting said electric heating means, temperature responsive control means including a bimetallic element spaced from both of said surfaces and responsive solely to heat radiated from one of said heating surfaces operatively connected to said switch means for accurately controlling the temperature of said heating surfaces, an S-shaped support having one end thereof secured to one of said reflector plates and the other end secured to one end of said bimetallic element, a longitudinally movable rod engaging an intermediate portion of said S-shaped support to vary the operating characteristic of said bimetallic element, and manually actuable means connected to said rod for causing selective longitudinal movement thereof.

5. The electric cooking appliance of claim 1 wherein said cases and said reflector plates each have peripheral rim portions and each reflector plate is nested in its associated case with the rim portions of the nested case and reflector plate disposed in face-to-face abutting relationship, and wherein each reflector is secured to its associated case by means extending through said abutting rim portions.

6. The electric cooking appliance of claim 1 wherein the one reflector plate secured to the one of said cases within which said temperature responsive means is mounted has an opening therein exposing said temperature responsive means to heat radiated from means defining the associated one of said cooking surfaces, and wherein said one reflector plate further includes a distorted portion thereof surrounding said opening for shielding said temperature responsive means from the radiant heating element supported thereon.

References Cited in the file of this patent

UNITED STATES PATENTS

| | | |
|---|---|---|
| 1,790,083 | Armstrong | Jan. 27, 1931 |
| 2,214,872 | Barnes | Sept. 17, 1940 |
| 2,285,156 | Gomersall | June 2, 1942 |
| 2,332,518 | Koci | Oct. 26, 1943 |
| 2,342,077 | Jepson | Feb. 15, 1944 |
| 2,354,240 | Young et al. | July 25, 1944 |
| 2,459,169 | Koci | Jan. 18, 1949 |
| 2,597,541 | Squires et al. | May 20, 1952 |
| 2,679,203 | Clark | May 25, 1954 |
| 2,710,906 | Lipsich et al. | June 14, 1955 |
| 2,786,928 | Roll et al. | Mar. 26, 1957 |